United States Patent [19]

Udagawa

[11] Patent Number: 5,395,128
[45] Date of Patent: Mar. 7, 1995

[54] METAL LAMINATE GASKET HAVING SEALING PORTIONS WITH DIFFERENT SURFACE PRESSURES

[75] Inventor: Tsunekazu Udagawa, Ichikawa, Japan

[73] Assignee: Ishikawa Gasket Co., Ltd., Tokyo, Japan

[21] Appl. No.: 115,086

[22] Filed: Sep. 2, 1993

[30] Foreign Application Priority Data

Sep. 10, 1992 [JP] Japan ............................. 4-063393 U

[51] Int. Cl.⁶ .............................................. F16J 15/08
[52] U.S. Cl. .................................. 277/235 B; 277/180
[58] Field of Search ................ 277/235 B, 180, 236, 277/235 R, 233, 234

[56] References Cited

U.S. PATENT DOCUMENTS

| | | |
|---|---|---|
| 4,739,999 | 4/1988 | Ishii et al. ....................... 277/235 B |
| 4,834,399 | 5/1989 | Udagawa et al. . |
| 4,995,624 | 2/1991 | Udagawa et al. ............... 277/235 B |
| 5,240,261 | 8/1993 | Udagawa et al. ............... 277/235 B |

FOREIGN PATENT DOCUMENTS

| | | |
|---|---|---|
| 0512178A | 11/1992 | European Pat. Off. . |
| 2636397 | 3/1990 | France . |
| 63-82056 | 5/1988 | Japan . |
| 63-101575 | 5/1988 | Japan . |

*Primary Examiner*—Daniel G. DePumpo
*Attorney, Agent, or Firm*—Kanesaka & Takeuchi

[57] ABSTRACT

A metal laminate gasket of the invention is installed in an internal combustion engine having at least one hole to be sealed. The gasket is basically formed of a first metal plate and a second metal plate situated over the first metal plate. The first and second metal plates respectively include first and second base portions extending substantially throughout an entire area of the engine, first and second curved portions to define first and second holes, and first and second flanges extending from the first and second curved portions. The second hole has a diameter greater than an outer diameter of the first flange so that the first flange is located inside the second curved portion when the first and second plates are assembled. The thickness of the first plate is greater than the thickness of the second plate and less than a double thickness of the second plate. Thus, when the gasket is compressed, the second flange provides surface pressure greater than that at the first flange to securely seal around the hole of the engine away from the first flange.

7 Claims, 1 Drawing Sheet

METAL LAMINATE GASKET HAVING SEALING PORTIONS WITH DIFFERENT SURFACE PRESSURES

BACKGROUND OF THE INVENTION AND RELATED ART STATEMENT

The present invention relates to a metal laminate gasket having sealing portions with different surface pressures for sealing around a hole.

In an internal combustion engine, in order to provide a light engine, a cylinder block as well as a cylinder head may be made of an aluminum alloy. In this case, if high surface pressure is applied through a gasket to seal around a cylinder bore at a portion immediately outside the cylinder bore, the cylinder bore may deform by the high surface pressure.

Even if a cylinder liner is installed in the cylinder block to define the cylinder bore, in case a high surface pressure is applied to the cylinder liner to seal around the cylinder bore, the cylinder liner may deform.

In Japanese Utility Model Publication No. 63-82056, a gasket includes a first sealing portion around a cylinder bore, which is formed by turning a plate around the cylinder bore, and a bead outside the first sealing portion to resiliently seal therearound. In this case, a high surface pressure is formed immediately outside the cylinder bore to securely seal around the cylinder bore, and the bead secondarily seal around the cylinder bore. Thus, the cylinder bore or the cylinder liner may deform.

In order to solve the above problem, U.S. Pat. No. 4,739,999 has been proposed to provide auxiliary and main sealing devices around a hole to be sealed. The auxiliary sealing device located close to the hole to be sealed provides sealing pressure less than that of the main sealing device to thereby prevent deformation of the cylinder liner.

The above U.S. patent operates as intended. However, the gasket of the above patent resiliently seals around the cylinder bore. In case resiliency is not required, or the cylinder head does not have strong rigidity, the gasket as disclosed in the above U.S. patent is not used.

Accordingly, one object of the invention is to provide a metal laminate gasket, wherein deformation of a cylinder block around a cylinder bore or a cylinder liner is prevented.

Another object of the invention is to provide a metal laminate gasket as stated above, wherein the cylinder bore can be securely sealed therearound.

A further object of the invention is to provide a metal laminate gasket as stated above, wherein even if rigidity of the cylinder head is not strong, vibration or deformation of the cylinder head is substantially prevented.

A still further object of the invention is to provide a metal laminate gasket as stated above, wherein the gasket can be easily and economically manufactured.

Further objects and advantages of the invention will be apparent from the following description of the invention.

SUMMARY OF THE INVENTION

In the present invention, a metal laminate gasket is used for an internal combustion engine having at least one hole to be sealed. The gasket is basically formed of a first metal plate and a second metal plate situated over the first metal plate.

The first plate includes a first base portion extending substantially throughout an entire area of the engine, a first curved portion extending from the first base portion to define a first hole corresponding to the hole of the engine, and a first flange extending from the first curved portion and located above the first base portion.

The second plate includes a second base portion situated above the first base portion at a side of the first flange and extending substantially throughout an entire area thereof, a second curved portion extending from the second base portion to define a second hole, and a second flange extending from the second curved portion to be located above the second base portion.

The second hole has a diameter greater than an outer diameter of the first flange so that the first flange is located inside the second curved portion when the first and second plates are assembled. The thickness of the first plate is greater than the thickness of the second plate but less than a double thickness of the second plate. Thus, when the gasket is compressed, the second flange provides surface pressure greater than the first flange to securely seal around the hole of the engine at a portion away from the first flange.

The first flange forms a first sealing portion adjacent to the hole of the engine, and the second flange forms a second sealing portion outside the first sealing portion. The second sealing portion non-resiliently and securely seals around the hole at a portion away from the hole. Thus, deformation of the cylinder block or cylinder liner is prevented.

In the invention, since the first and second flanges turned over the respective base portions form the sealing portions, the sealing portions can be formed easily. Further, since the second flange does not provide resiliency, when the cylinder head is tightened relative to the cylinder block, the cylinder head does not receive a force from the gasket to push the cylinder head upwardly around the cylinder bore. Thus, deformation of the cylinder head such that a middle portion of the cylinder head rises is prevented. The gasket is useful for the cylinder head, which does not have strong rigidity.

In the present invention, a surface pressure regulation plate for regulating surface pressure of the second sealing portion may be formed on the second base portion of the second plate. Further, an outer plate may be provided outside the surface pressure regulation plate and the second flange. The outer plate may have a bead located between the first flange and the first base portion to provide resiliency to the first sealing portion.

DETAILED DESCRIPTION OF PREFERRED EMBODIMENTS

DETAILED DESCRIPTION OF PREFERRED EMBODIMENTS

Figure 1:
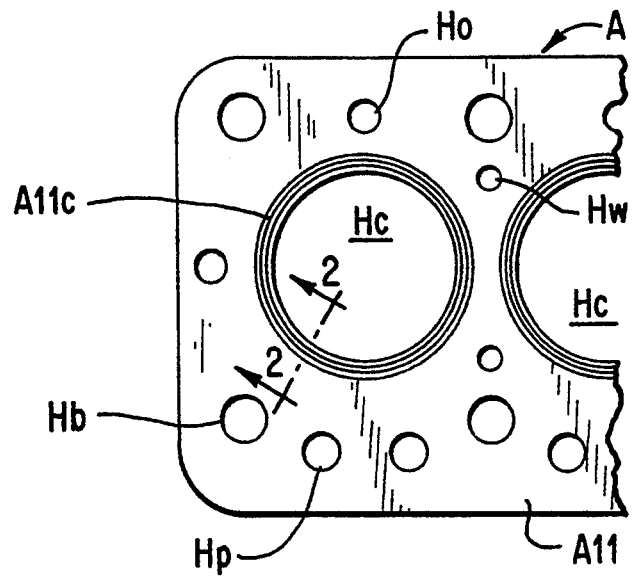
FIG. 1 is a partial plan view of a first embodiment of a gasket of the invention.
Figure 2:
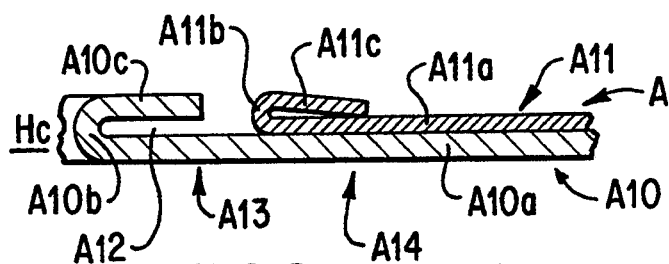
FIG. 2 is an enlarged section view taken along line 2—2 in FIG. 1.

Referring to FIGS. 1 and 2, a first embodiment A of the gasket of the invention is shown. The gasket A is a cylinder head gasket and includes a plurality of cylinder bores Hc, water holes Hw, oil holes Ho, bolt holes Hb, push rod holes Hp and so on, as in the conventional gasket.

In the gasket A, portions around the cylinder bores Hc are sealed in accordance with the present invention. Any sealing means may be used for sealing around the water holes Hw and oil holes Ho, which are omitted in the drawings.

The gasket A is formed of a lower plate A10, and an upper plate A11, which extend substantially throughout an entire area of an engine. The lower plate A10 includes a base portion A10a, a curved portion A10b to define a cylinder bore Hc, and a flange A10c. The flange A10c is located above the base portion A10a with a space A12 therebetween.

The upper plate A11 includes a base portion A11a to be located above the base portion A10a, a curved portion A11b, and a flange A11c located above the base portion A11a. The curved portion A11b defines a hole to receive the flange A10c therein without overlapping therewith.

The thickness of the plate A10 is greater than that of the plate A11, but less than the double thickness of the plate A11. The gasket A includes a first sealing portion A13 formed of the flange A10c and the base portion A10a, and a second sealing portion A14 formed of the flange A11c, the base portion A11a and the base portion A10a. The thickness at the first sealing portion A13 is less than the thickness at the second sealing portion A14. An inner space portion is formed between the first and second sealing portions and an outer space portion is formed outside the second sealing portion.

When the gasket A is installed in the engine and is tightened, the flange A11c is completely compressed, while the flange A10c is slightly compressed with resiliency. Thus, the second sealing portion A14 provides high surface pressure away from the cylinder bore Hc, while the first sealing portion A13 provides surface pressure around the cylinder bore Hc less than the second sealing portion A14.

In the gasket A, deformation of the cylinder bore or the cylinder liner is prevented. Also, in the gasket A, since the second sealing portion A14 does not provide resilient surface pressure when the gasket is tightened, the gasket A receives only a small compression deformation in the change of surface pressure due to combustion of fuel in the cylinders, so that vibration of a cylinder head (not shown) due to combustion in the cylinders is reduced. The gasket A securely seals around the cylinder bore Hc at the second sealing portion A14.

Figure 3:
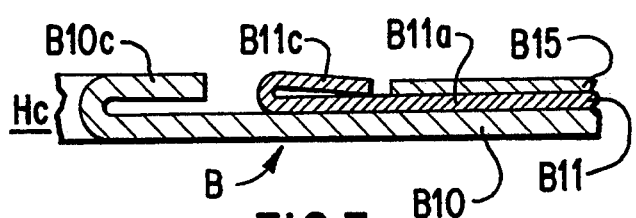
FIGS. 3-5 are section views, similar to FIG. 2, for showing second to fourth embodiments of the invention.

FIG. 3 shows a second embodiment B of the metal laminate gasket of the invention. The gasket B is formed of a lower plate B10 with a flange B10c, and an upper plate B11 with a flange B11c, as in the gasket A. In the gasket B, a surface pressure regulation plate B15 is provided on a base portion B11a to regulate surface pressure at the flange B11c.

In the gasket B, the thickness of the plate B15 is slightly less than that of the flange B11c or the upper plate B11. Thus, the surface pressure is substantially concentrated at the flange B11c to securely seal around the cylinder bore Hc, while the surface pressure is slightly applied on the plate B15. The surface pressure can be controlled by regulating the thickness of the plate B15. The gasket B operates as in the gasket A.

Figure 4:
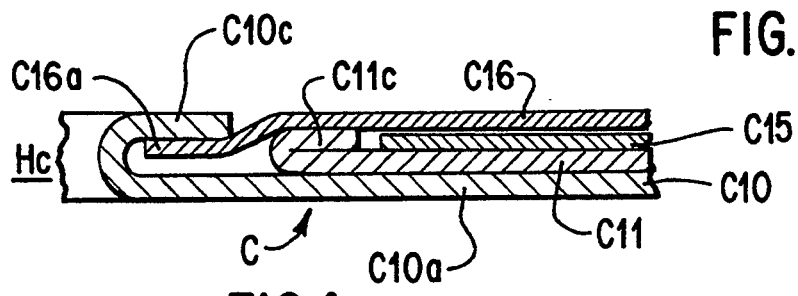

FIG. 4 shows a third embodiment C of the metal laminate gasket of the invention. The gasket C is formed of a lower plate C10 with a flange C10c, an upper plate C11 with a flange C11c, and a surface pressure regulation plate C15, as in the gasket B. The gasket C, however, further includes an outer plate C16 with an inner portion C16a. The outer plate C16 is generally located above the surface pressure regulation plate C15, but the inner portion C16a is located between the flange C10c and a base portion C10a. The gasket C operates as in the gasket B.

Figure 5:
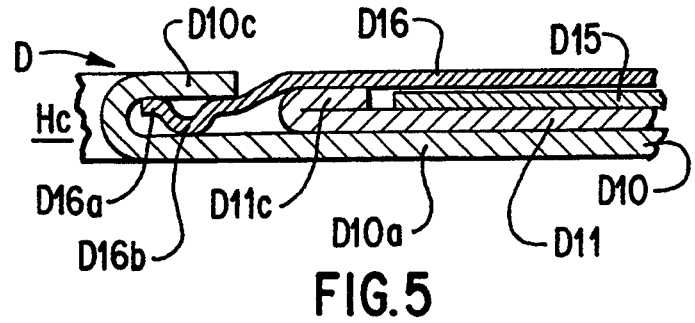

FIG. 5 shows a fourth embodiment D of the metal laminate gasket of the invention. The gasket D is formed of a lower plate D10 with a base portion D10a and a flange D10c, an upper plate D11 with a flange D11c, a surface pressure regulation plate D15, and an outer plate D16, as in the gasket C. In the gasket D, however, the plate D16 is provided with a bead D16b at an inner portion D16a. The bead D16b is located between the flange D10c and the base portion D10a.

When the gasket D is tightened, the flange D11c is completely compressed to provide a main sealing pressure thereat without elasticity, while the bead D16b is compressed to resiliently seal around the cylinder bore Hc. Since the bead D16b is not fully flattened, creep relaxation of the bead D16b is prevented. The gasket D operates as in the gasket C.

In the present invention, the main sealing is made away from the cylinder bore to be sealed. Thus, deformation of the cylinder bore or the cylinder liner is prevented. Also, the gasket can be easily formed.

While the invention has been explained with reference to the specific embodiments of the invention, the explanation is illustrative and the invention is limited only by the appended claims.

What is claimed is:

1. A metal laminate gasket for an internal combustion engine having at least one hole to be sealed, comprising:
   a first metal plate including a first base portion extending substantially throughout an entire area of the engine, a first curved portion extending from the first base portion to define a first hole corresponding to the hole of the engine, and a first flange extending from the first curved portion in a direction away from the first hole and located above the first base portion, and
   a second metal plate including a second base portion situated above the first base portion at a side of the first flange and extending substantially throughout an entire area of the first base portion, a second curved portion extending from the second base portion to define a second hole having a diameter greater than an outer diameter of the first flange so that the first flange is located inside the second curved portion when the first and second plates are assembled, and a second flange extending from the second curved portion in a direction away from the second hole and located above the second base portion, the thickness of the first plate being greater than the thickness of the second plate and less than a double thickness of the second plate so that when the gasket is compressed, the second flange provides surface pressure greater than that at the first flange to securely seal around the hole of the engine away from the first flange.

2. A metal laminate gasket according to claim 1, wherein said first flange forms a first sealing portion adjacent to the hole of the engine, and said second flange forms a second sealing portion outside the first sealing portion.

3. A metal laminate gasket according to claim 2, further comprising an inner space portion between the first and second sealing portions.

4. A metal laminate gasket according to claim 3, further comprising an outer space portion outside the second sealing portion so that tightening pressure is concentrated at the second sealing portion.

5. A metal laminate gasket according to claim 3, further comprising a third metal plate having a third hole greater than an outer diameter of the second flange and situated above the second base portion at a side of the second flange without overlapping the second flange, the thickness of the third plate being less than the thickness of the second plate.

6. A metal laminate gasket according to claim 5, further comprising a fourth metal plate having a fourth hole greater than the first hole, an inner portion around the fourth hole and an outer portion outside the inner portion, said inner portion being located between the first flange and the first base portion and the outer portion being located above the second flange and the third plate.

7. A metal laminate gasket according to claim 6, wherein said fourth plate includes a bead at the inner portion under the first flange to provide resiliency at the first sealing portion.

* * * * *

UNITED STATES PATENT AND TRADEMARK OFFICE
CERTIFICATE OF CORRECTION

PATENT NO. : 5,395,128
DATED : March 7, 1995
INVENTOR(S) : Tsunekazu Udagawa

It is certified that error appears in the above-indentified patent and that said Letters Patent is hereby corrected as shown below:

Column 2, lines 52 - 53, change "DETAILED DESCRIPTION OF PREFERRED EMBODIMENTS" to --BRIEF DESCRIPTION OF THE DRAWINGS--.

Signed and Sealed this

Twenty-third Day of May, 1995

Attest:

BRUCE LEHMAN

*Attesting Officer*  *Commissioner of Patents and Trademarks*